June 24, 1941.  A. G. HOLTAM  2,247,296
TAP, VALVE, AND THE LIKE
Filed Dec. 6, 1940
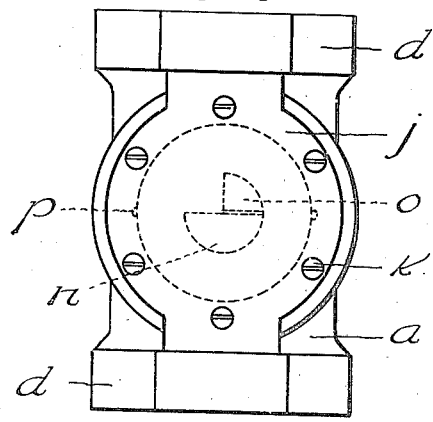
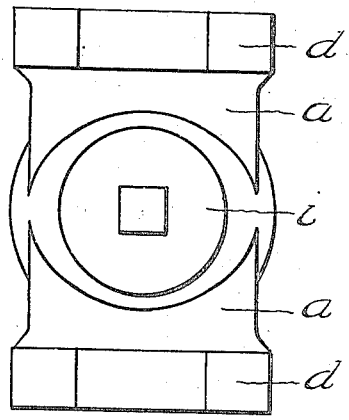
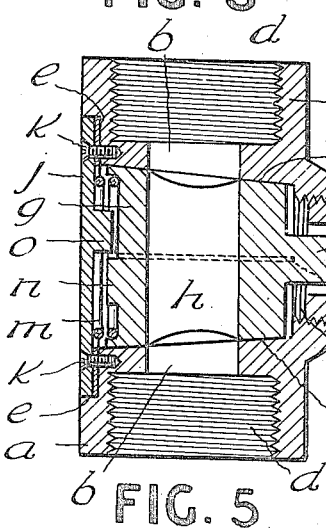
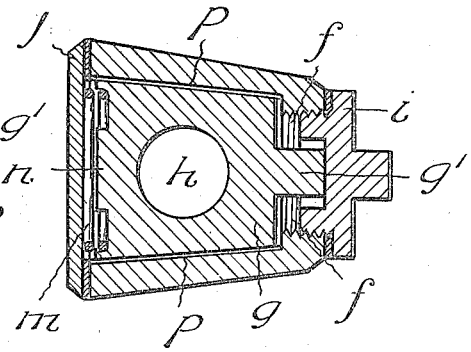
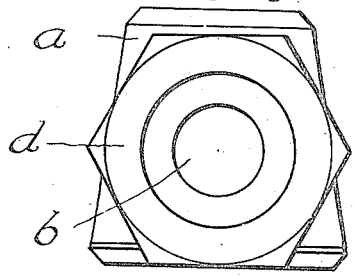
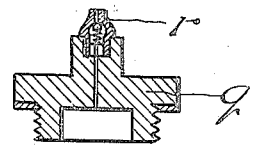
INVENTOR:
ARTHUR GEORGE HOLTAM
By Samuel Scrivener Jr.
ATTORNEY Patented June 24, 1941

2,247,296

UNITED STATES PATENT OFFICE 2,247,296

TAP, VALVE, AND THE LIKE

Arthur George Holtam, Cheltenham, England

Application December 6, 1940, Serial No. 368,956
In Great Britain May 4, 1939

1 Claim. (Cl. 251—91)

The invention relates to taps or cocks for the control of gas from gas mains into service connections where the tap or cock may remain in an open or closed position without disturbance for prolonged periods of time. Where service connections to mains may have to be made it is usual to provide a nipple secured in a drilling in or welded to the main wall which nipple carries an external screw thread, or in the case of a high pressure gas main sometimes both an internal and external screw thread and sometimes a saddle or flange clipped or bolted to the main, for the connection of the service piping. Usually in the case of the high pressure main the nipple is inserted by a drilling and tapping machine, for example that known as the "Universal Under Pressure Drilling and Tapping Machine" and a fluid stopping plug is screwed into the interior of the nipple as soon as the nipple is secured in place. On the other hand sometimes the internal screwing of the nipple is dispensed with and a suitable cock in closed position is screwed on to the nipple or saddle. It is for such a purpose that the present invention is intended where even a trifling leak to atmosphere is of the utmost importance since it will continue over possibly quite long periods of time.

The object of the invention is to provide a completely enclosed and sealed tap or cock for such a purpose which in its preferred construction is nited by its sealing or enclosing means, and is readily made free for use even after standing in open or closed position over a long period of time.

The invention consists in a gas service connection cock or tap in which the body is adapted to receive the cock plug and to provide a reasonably fluid-tight seating for it in the ordinary way and in addition receives and is sealed by an imperforate closure member at each end of the plug so that the cock plug is housed in a chamber completely sealed except for its main and service connections.

The cock plug is made shorter in length than the chamber and its operative end may be housed in a chambered closure plug which forms one of the imperforate closure members of the body.

It is a preferred arrangement that one of the closure members itself forms part of the niting means for the plug by which its fully open and closed positions are determined.

One of the closure and sealing members may be a plate for fitting a shallow recessed seating provided with a suitable base surface against which a gasket or packing is compressed by separate screw means provided for securing the closure member against the body. Alternatively the screws and gasket, may be dispensed with and the closure plate member attached to the cock body in a fluid tight manner by brazing or soldering.

In the preferred form of the invention illustrated in the accompanying drawing, the tapered plug chamber is provided with lubricating passages, which can be used, as is known in some valves and cocks, for freeing the plug after it has remained for a long period in open or closed position.

Figure 1 is an elevation of the cock.
Figure 2 is an opposite elevation.
Figure 3 is a longitudinal section.
Figure 4 is a cross section.
Figure 5 is an end view, and
Figure 6 shows an alternative construction of closing plug which may be used when the cock is to be closed or opened after being left in one position without operation for a long time.

In the drawing $a$ is the cock body provided with the usual fluid flow bore $b$ and a tapered plug chamber or seating across that bore marked $c$. $d\ d$ are end sockets for connecting the body with a supply main and a service connection pipe. A shallow, recessed seating is also formed on the cock body at $e$ around one end of the plug chamber which recessed seating has a suitable, flat, base surface on the body produced for example by machining, by the shaping die for the body if it is made as a hot stamping, or other means. Opposite this seating and in alignment with the tapered plug chamber $c$ is a tapped hole $f$ to receive the closure plug $i$ which is preferably of the chambered form shown for the purpose hereinafter appearing.

The taper cock plug is referred to by the letter $g$. It is made as good a working fit in the taper chamber $c$ as possible and contains the usual through passage $h$ which may be turned into or out of alignment with the bore $b$ in the usual way. The cock plug $g$ is turned by means of a square, or other suitable, end piece $g'$ which is normally received in the chambered face of the end closure plug $i$ but can be engaged by a tool after that plug has been removed from the tapped hole $f$.

The cock plug $g$ is shorter than the seating chamber $c$, its large end face lying within the chamber just below the base of the recess $e$ and its operative end $g'$ lying within the chambered imperforate plug $i$. In the recess $e$ is fitted and secured an enclosing plate $j$ which is provided with a sealing gasket or packing between its inner face and the flat base of the recess. To ensure effective sealing, a series of screws $k$ in this illustrated example are disposed equally around the plate $j$ and pass into the body $a$. With the closure plug $i$ screwed into the hole $f$ the taper cock plug is thus completely enclosed in a sealed chamber and if any slight leakage should at first occur around its contour, no release to atmosphere can take place.

The cock plug $g$ is seated by a spring as is known in gas and fluid cocks. Here the spring is shown as a helical spring $m$ bearing between the large plug face and the enclosing plate $j$.

In order that the open and closed positions of the cock plug $g$ can be accurately determined, with its passage $h$ in line with the bore $b$ or at right angles thereto, some form of niting or stopping means are usually provided. In the illustrated arrangement according to the invention the large end face of the plug is provided with either a semi-circular or quadrantal segment $n$ projecting from it and the inner face of the enclosing and sealing plate $j$ carries a complementary projection $o$. If the projection $n$ is semi-circular then the projection $o$ on the plate $j$ is a quadrantal segment, providing two flat faces at right angles to each other against which the flat face of the semi-circular segment $n$ will be stopped after moving through a right angle in either direction of rotation.

The surface of tapered plug chamber $c$ may be provided with oil ducts $p$. A chambered end plug $q$ as shown at Figure 6, provided with a non-return type of oiling nipple $r$ can be fitted in place of the closure end plug $i$ to enable lubricant to be forced in to assist in releasing the cock plug $g$ if it should bind as a result of long periods of inaction and the presence of rust.

I claim:

A gas tap comprising a generally cylindrical body having a passage extending longitudinally therethrough and being threaded at its ends for connection with a gas supply pipe and with a service branch, a frustro-conical bore in said body the axis of which is transverse to the axis of the body, a plug adapted to fit into said bore and having a port therein cooperating with the passage in the body, said plug being shorter than said bore and being provided at its smaller end with a projecting operating part of angular section, a boss on said body surrounding the small end of said bore defining an internally screw-threaded opening, a chambered sealing cap having a part screwed into said opening and housing the operating part of said plug and at the same time sealing the bore at that end, a second sealing means formed to fit in a recess in the wall of the body at the large end of the bore, a semi-circular abutment integral with the large end of the tapered plug and being arranged adjacent a quadrantal projection on the inner face of the sealing means at the large end of the bore, the projection being provided with two flat faces at right angles to each other with which the flat face of the semi-circular abutment will engage after it has moved through a right angle in either direction, and resilient means between the second sealing means and the large end of the plug adapted to resiliently seat the plug in the bore.

ARTHUR GEORGE HOLTAM.